US012091635B2

(12) United States Patent
Kang et al.

(10) Patent No.: US 12,091,635 B2
(45) Date of Patent: Sep. 17, 2024

(54) FLUORINATED SURFACTANT COMPOSITION

(71) Applicant: AK ChemTech CO., LTD., Seoul (KR)

(72) Inventors: Hyun Chul Kang, Daejeon (KR); Won Jun Jeong, Daejeon (KR); Bu Hyeon Kim, Sejong-Si (KR); Hyun Pil Yu, Daejeon (KR); Ki Ho Park, Daejeon (KR); Won Gook Shin, Daejeon (KR); Byung Jo Kim, Daejeon (KR)

(73) Assignee: AK ChemTech CO., LTD., Seoul (KR)

( * ) Notice: Subject to any disclaimer, the term of this patent is extended or adjusted under 35 U.S.C. 154(b) by 310 days.

(21) Appl. No.: 17/540,375

(22) Filed: Dec. 2, 2021

(65) Prior Publication Data

US 2022/0186141 A1 Jun. 16, 2022

(30) Foreign Application Priority Data

Dec. 11, 2020 (KR) ........................ 10-2020-0173372

(51) Int. Cl.

| | |
|---|---|
| ***C11D 17/00*** | (2006.01) |
| ***C11D 1/00*** | (2006.01) |
| ***C11D 1/72*** | (2006.01) |
| ***C11D 1/88*** | (2006.01) |

(52) U.S. Cl.

CPC ................ *C11D 1/004* (2013.01); *C11D 1/72* (2013.01); *C11D 1/886* (2013.01); *C11D 2111/22* (2024.01)

(58) Field of Classification Search

CPC ............................ C11D 1/004; C11D 11/0047

See application file for complete search history.

(56) References Cited

U.S. PATENT DOCUMENTS

| | | | |
|---|---|---|---|
| 5,527,962 A | 6/1996 | Pavia et al. | |
| 5,667,772 A | 9/1997 | Zastrow et al. | |
| 8,524,438 B2 * | 9/2013 | Kim | ..................... G03F 7/0002 430/192 |
| 2004/0057906 A1 | 3/2004 | Hsu et al. | |

FOREIGN PATENT DOCUMENTS

| | | | |
|---|---|---|---|
| CN | 1576322 | A | 2/2005 |
| CN | 103831058 | A | 6/2014 |
| CN | 104755533 | A | 7/2015 |
| CN | 110997081 | A | 4/2020 |
| EP | 0231091 | A1 | 8/1987 |
| JP | S502757 | A | 1/1975 |
| JP | S61215398 | A | 9/1986 |
| JP | 06-182176 | A | 7/1994 |
| JP | H11-507019 | A | 6/1999 |
| JP | 2019-502682 | A | 1/2019 |
| KR | 10-1999-0082249 | A | 11/1999 |
| KR | 10-2001-0032921 | A | 4/2001 |
| KR | 10-2002-0001754 | A | 1/2002 |
| KR | 10-2007-0113096 | A | 11/2007 |
| KR | 10-2011-0063845 | A | 6/2011 |
| KR | 10-2013-0000705 | A | 1/2013 |
| KR | 10-2017-0054435 | A | 5/2017 |
| KR | 10-2018-0053462 | A | 5/2018 |
| KR | 10-2018-0132605 | A | 12/2018 |
| TW | 201412906 | A | 4/2014 |
| WO | 2018/119028 | A1 | 6/2018 |

OTHER PUBLICATIONS

L. Guoqiang et al., "Research progress on synthesis methods of fluorocarbon surgactants", Synthetic Technology and Application, vol. 25, No. 3, Sep. 2010.

Chinese Office Action dated Jun. 30, 2023, issued during the prosecution of Chinese Patent Application No. 202111407388.3.

* cited by examiner

*Primary Examiner* — Necholus Ogden, Jr.

(74) *Attorney, Agent, or Firm* — Locke Lord LLP; Scott D. Wofsy; Gabrielle L. Gelozin

(57) ABSTRACT

Disclosed is a surfactant composition in which at least one of surface tension and interfacial tension is superior, the composition including a fluorinated surfactant and a phospholipid-based surfactant, and optionally further including a sulfosuccinate-based surfactant.

11 Claims, No Drawings

FLUORINATED SURFACTANT COMPOSITION

CROSS-REFERENCE TO RELATED APPLICATION

This application claims under 35 U.S.C. § 119(a) the benefit of priority from Korean Patent Application No. 10-2020-0173372, filed on Dec. 11, 2020, the entire contents of which are incorporated herein by reference.

BACKGROUND

(a) Technical Field

The present disclosure relates to a fluorinated surfactant composition and the use thereof.

(b) Background Art

A surfactant is added to a composition to lower surface tension, thereby improving ease of application and dispersion of the composition, permeability, and the like.

A fluorinated surfactant exhibits the inherent surface properties of fluorine, such as low surface tension, water repellency, oil repellency, and the like, and is thus used as a representative surface modifier and surfactant. The addition of a fluorinated surfactant to a formulation is capable of improving formulation properties, for example wetting behavior and leveling properties, as well as reducing interfacial tension and surface tension values. The specific properties that are affected depend on the specific formulation and the specific composition of each surfactant.

In particular, with regard to a semiconductor stripper or cleaning solution, the pattern is made finer and more complicated with an increase in the density of integrated circuits, so there is increasing demand for a stripper or cleaning solution having lower surface tension and interfacial tension values.

CITATION LIST

Patent Literature (Patent Document 1) Korean Patent Application Publication No. 10-1999-0082249

(Patent Document 2) Korean Patent Application Publication No. 10-2007-0113096

(Patent Document 3) Korean Patent Application Publication No. 10-2002-0001754

(Patent Document 4) Korean Patent Application Publication No. 10-2013-0000705

(Patent Document 5) Korean Patent Application Publication No. 10-2017-0054435

(Patent Document 6) International Patent Application Publication No. WO 2018-119028

SUMMARY OF THE DISCLOSURE

The present inventors have endeavored to solve the problems encountered in the related art, and the present invention is intended to provide a surfactant composition having a remarkably low interfacial tension value and superior surface tension through a combination of a fluorinated surfactant and a hydrocarbon-based surfactant.

An aspect of the present invention is to provide a surfactant composition including a fluorinated surfactant and a hydrocarbon-based surfactant, particularly a phospholipid-based surfactant.

With regard to this aspect of the present invention, the hydrocarbon-based surfactant may include a phospholipid-based surfactant and a sulfosuccinate-based surfactant.

With regard to this aspect of the present invention, the phospholipid-based surfactant may be a gemini surfactant.

Another aspect of the present invention is to provide a method of preparing the surfactant composition.

The objects of the present invention are not limited to the foregoing. The objects of the present invention will be able to be clearly understood through the following description and to be realized by the means described in the claims and combinations thereof.

An aspect of the present invention provides a composition including a fluorinated surfactant and a phospholipid-based surfactant, the composition being used as a surfactant.

With regard to this aspect of the present invention, the phospholipid-based surfactant may be a gemini compound.

With regard to this aspect of the present invention, the phospholipid-based surfactant may be an amphiphilic gemini compound.

With regard to this aspect of the present invention, the fluorinated surfactant may be a nonionic surfactant.

With regard to this aspect of the present invention, the fluorinated surfactant may be represented by Chemical Formula 1 below.

Rf—(CH2)y-(CH2CH2O)x-H [Chemical Formula 1]

In Chemical Formula 1, Rf is a linear or branched perfluorinated alkyl, the number of perfluorinated carbon atoms being 1 to 10, x is an integer of 1 to 50, and y is an integer of 1 to 10.

With regard to this aspect of the present invention, the phospholipid-based surfactant and the fluorinated surfactant may be included at a weight ratio of 1:1-50.

With regard to this aspect of the present invention, the phospholipid-based surfactant and the fluorinated surfactant may be included at a weight ratio of 1:2-15.

With regard to this aspect of the present invention, the composition may further include a sulfosuccinate-based surfactant.

With regard to this aspect of the present invention, the composition may include the fluorinated surfactant, the phospholipid-based surfactant, and the sulfosuccinate-based surfactant at a weight ratio of 1:0.1-3.0:0.1-3.0.

With regard to this aspect of the present invention, the composition may include the fluorinated surfactant, the phospholipid-based surfactant, and the sulfosuccinate-based surfactant at a weight ratio of 1:0.1-1.0:0.1-2.0.

With regard to this aspect of the present invention, the phospholipid-based surfactant may be represented by Chemical Formula 2 below.

[Chemical Formula 2]

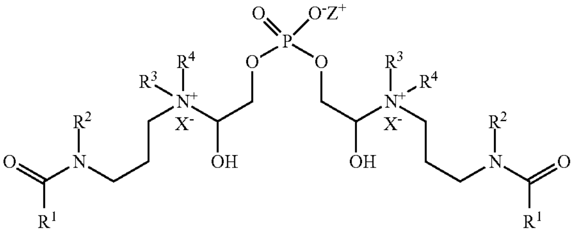

In Chemical Formula 2, $R^1$ is a C1-C22 linear or branched saturated alkyl group, $R^2$, $R^3$, and $R^4$ are the same as or different from each other, and are a hydrogen atom or a C1-C3 saturated alkyl group, $X^-$ is a halogen anion, and $Z^+$ is an alkali metal cation.

With regard to this aspect of the present invention, the sulfosuccinate-based surfactant may be represented by Chemical Formula 3 below.

[Chemical Formula 3]

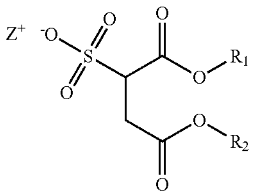

In Chemical Formula 3, $R_1$ and $R_2$ are the same as or different from each other, and are a C1-C22 linear or branched saturated alkyl group, and $Z^+$ is an alkali metal cation.

With regard to this aspect of the present invention, the composition may satisfy at least one of the following characteristics:

(a) a surface tension of 27 or less; and (b) an interfacial tension of 3 or less.

With regard to this aspect of the present invention, the composition may be used as a surfactant in semiconductor or display processing.

DETAILED DESCRIPTION

The above and other objects, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the disclosure and to sufficiently transfer the spirit of the present invention to those skilled in the art.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

In the present specification, when a range is described for a variable, it will be understood that the variable includes all values within the stated range, including the end points. For example, the range of "5 to 10" will be understood to include any subranges, such as 6 to 10, 7 to 10, 6 to 9, 7 to 9 and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

Hereinafter, the present invention will be described in detail.

A surfactant, particularly a surfactant composition for use in the manufacture of a semiconductor or a display, has to satisfy physical properties such as superior surface tension and interfacial tension. Specifically, with regard to surface tension, based on ASTM D1331, the surface tension measured in a 0.1% solution/PGMEA is preferably 27 or less. In addition, with regard to interfacial tension, based on ASTM D971, the interfacial tension measured in a 0.1% solution/cyclohexane is preferably 3 or less. Accordingly, the present invention is intended to provide a surfactant composition having at least one of surface tension and interfacial tension at a level capable of realizing desirable physical properties.

In order to realize the above physical properties, the present invention is intended to provide a composition including an EO adduct of a fluorinated surfactant, a gemini hydrocarbon-based surfactant, the preparation method of which is devised by the present inventors, and additionally sodium dioctyl sulfosuccinate, which is a sulfosuccinate-type hydrocarbon-based surfactant. In one embodiment, the fluorinated surfactant, the gemini hydrocarbon-based surfactant, and the sulfosuccinate-type hydrocarbon-based surfactant may be included at a weight ratio of 44:9:47. As such, not only surface tension but also interfacial tension may be realized at desired levels.

Hereinafter, various aspects of the present invention will be described.

An aspect of the present invention provides a composition including a fluorinated surfactant and a phospholipid-based surfactant, the composition being used as a surfactant.

With regard to this aspect of the present invention, the phospholipid-based surfactant is a gemini compound.

The gemini surfactant has excellent water solubility and thus exhibits improved surface properties at a lower concentration, such as the ability to form critical micelles, the ability to lower surface tension, dispersibility, and the like. Moreover, the surface activity of the gemini surfactant varies depending on the structural characteristics thereof. By imparting a new function to a general surfactant using an appropriate linker group, not only fundamental surface properties, but also emulsification power, dispersibility, cleaning power, miscibility with other compounds, etc. may be improved.

With regard to this aspect of the present invention, the phospholipid-based surfactant is an amphiphilic gemini compound.

With regard to this aspect of the present invention, the fluorinated surfactant is a nonionic surfactant.

With regard to this aspect of the present invention, the fluorinated surfactant is represented by Chemical Formula 1 below.

Rf—(CH2)y-(CH2CH2O)x-H [Chemical Formula 1]

In Chemical formula 1, Rf is a linear or branched perfluorinated alkyl, the number of perfluorinated carbons being 1 to 10, x is an integer of 1 to 50, and y is an integer of 1 to 10.

Rf is a fluoroaliphatic radical or group. Rf is generally a fluorinated, preferably saturated, monovalent non-aromatic radical having at least 3 carbon atoms. The fluoroaliphatic radical is linear, branched, or, if sufficiently large, cyclic. A fully fluorinated radical is preferred, but hydrogen or chlorine atoms may be present in the radical, provided that at most one of these atoms is present for every two carbon atoms. Most preferred is a fluoroaliphatic radical containing 1 to 12 carbon atoms.

In one embodiment, the fluorinated surfactant may be represented by Chemical Formula 1 in which y is 1 and x is 2.

In one embodiment, the fluorinated surfactant may be represented by Chemical Formula 1 in which y is 1 and x is 4.

In one embodiment, the fluorinated surfactant may be represented by Chemical Formula 1 in which y is 1 and x is 6.

In one embodiment, the fluorinated surfactant may be represented by Chemical Formula 1 in which y is 1 and x is 8.

In one embodiment, the fluorinated surfactant may be represented by Chemical Formula 1 in which y is 1 and x is 10.

With regard to this aspect of the present invention, the phospholipid-based surfactant and the fluorinated surfactant are included at a weight ratio of 1:1-50.

With regard to this aspect of the present invention, the phospholipid-based surfactant and the fluorinated surfactant are included at a weight ratio of 1:2-15.

With regard to this aspect of the present invention, the composition further includes a sulfosuccinate-based surfactant.

With regard to this aspect of the present invention, the composition includes the fluorinated surfactant, the phospholipid-based surfactant, and the sulfosuccinate-based surfactant at a weight ratio of 1:0.1-3.0:0.1-3.0.

With regard to this aspect of the present invention, the composition includes the fluorinated surfactant, the phospholipid-based surfactant, and the sulfosuccinate-based surfactant at a weight ratio of 1:0.1-1.0:0.1-2.0.

With regard to this aspect of the present invention, the composition may include 0.01 to 95 wt % of the fluorinated surfactant based on the total weight of the composition.

With regard to this aspect of the present invention, the composition may include 0.01 to 95 wt % of the phospholipid-based surfactant based on the total weight of the composition.

With regard to this aspect of the present invention, the composition may include 0.01 to 95 wt % of the gemini phospholipid-based surfactant based on the total weight of the composition.

With regard to this aspect of the present invention, the composition may include 0.01 to 95 wt % of the sulfosuccinate-based surfactant based on the total weight of the composition.

With regard to this aspect of the present invention, the phospholipid-based surfactant is represented by Chemical Formula 2 below.

[Chemical Formula 2]

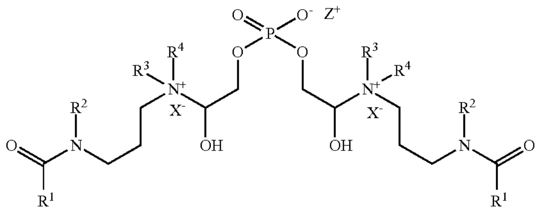

In Chemical Formula 2, $R^1$ is a C1-C22 linear or branched saturated alkyl group, $R^2$, $R^3$, and $R^4$ are the same as or different from each other and are a hydrogen atom or a C1-C3 saturated alkyl group, $X^-$ is a halogen anion, and $Z^+$ is an alkali metal cation.

In one embodiment, the surfactant of Chemical Formula 2 is prepared using a method of preparing a phospholipid-based surfactant including the first step of reacting a phosphate compound represented by the following Formula (2) with an oxirane compound represented by the following Formula (3) to obtain a bis(3-halo-2-hydroxypropyl)phosphate compound represented by the following Formula (4) and the second step of subjecting the bis(3-halo-2-hydroxypropyl)phosphate compound represented by Formula (4) to a combination reaction with an amidopropylamine compound represented by the following Formula (5) to prepare a phospholipid-based surfactant represented by the following Formula (1), as shown in Scheme 1 below.

[Scheme 1]

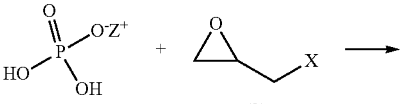

(2) (3)

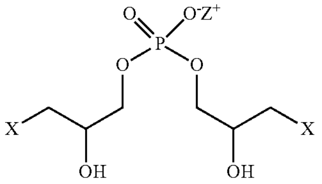

(4)

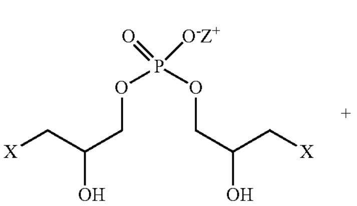

(4)

-continued

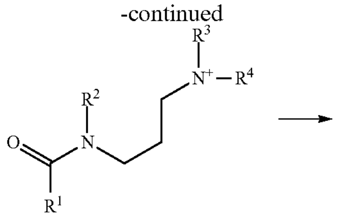

(5)

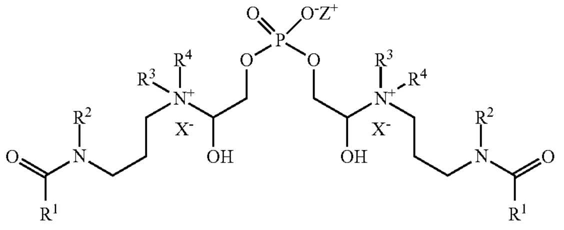

(1)

In Scheme 1, $R^1$ is a C1-C22 linear or branched saturated alkyl group, $R^2$, $R^3$, and $R^4$ are the same as or different from each other and are a hydrogen atom or a C1-3 saturated alkyl group, $X^-$ is a halogen anion, and $Z^+$ is an alkali metal cation.

According to the above preparation method, it is possible to efficiently synthesize the phospholipid-based surfactant represented by Chemical Formula 2, which has high water solubility and superior physicochemical properties such as biodegradability, low irritation, and the like.

The method of preparing the phospholipid-based surfactant of Chemical Formula 2 is specified below. In the first step, the phosphate compound represented by Formula (2) and the oxirane compound represented by Formula (3) are reacted with each other, thus obtaining the bis(3-halo-2-hydroxypropyl) phosphate compound represented by Formula (4). In the first step, the oxirane compound represented by Formula (3) is used at a molar ratio of 1:1.5-2.5, preferably 1:1.7-2.1, based on 1 mole of the phosphate compound represented by Formula (2). Here, if the amount of the oxirane compound represented by Formula (3) is too large, it may remain as unreacted material, so great economic loss may occur. On the other hand, if the amount thereof is too small, stability in the human body may be deteriorated due to the presence of the unreacted phosphate compound, and the finally prepared surfactant may be separated during long-term storage. As the reaction solvent used in the first step, at least one polar solvent selected from among water, alcohols, and glycols may be used. More specifically, water, alcohols having 1 to 4 carbon atoms such as methanol, ethanol, etc., and glycols such as ethylene glycol, propylene glycol, etc. may be used. The polar solvent may be used in an amount of 20 to 80 wt % based on the mass of the phosphate compound represented by Formula (2). The reaction temperature is maintained at a temperature of 40° C. to 150° C. If the reaction temperature is too low, the reaction does not proceed efficiently, so a large amount of unreacted material may be present. On the other hand, if the reaction temperature is too high, oxirane side-reaction products may be generated, and side-reaction products may remain in the final product, which may decrease the purity of the product. In the second step, the bis(3-halo-2-hydroxypropyl)phosphate compound represented by Formula (4) is subjected to a combination reaction with the amidopropylamine compound represented by Formula (5), thereby preparing a phospholipid-based biosurfactant of interest. In the second step, the amidopropylamine compound represented by Formula (5) is used at a molar ratio of 1:0.5-2.5, preferably 1:0.5-1.5, based on 1 mole of the bis(3-halo-2-hydroxypropyl)phosphate compound represented by Formula (4). If the amount of the amidopropylamine compound represented by Formula (5) is too large, it may remain as unreacted material, so great economic loss may occur. On the other hand, if the amount thereof is too small, the surfactant may be separated during long-term storage due to the presence of the unreacted compound represented by Formula (4). The reaction solvent used in the second step is selected from among examples of the polar solvent used in the first step, and may be used in an amount of 10 to 80 wt % based on the mass of the compound represented by Formula (4). The reaction temperature is maintained at a temperature of 40° C. to 150° C. If the reaction temperature is too low, the reaction does not proceed efficiently and thus a large amount of unreacted material may be present, whereas if the reaction temperature is too high, the color of the reactants becomes cloudy and side-reaction products of the compound represented by Formula (4) may be generated, and the side-reaction products may remain in the final product, which may decrease the purity of the product. Meanwhile, the amidopropylamine compound represented by Formula (5) used as the reactant in the preparation method may be prepared by subjecting a fatty acid compound represented by the following Formula (6) to a condensation reaction with a diamine compound represented by the following Formula (7), as shown in Scheme 2 below.

[Scheme 2]

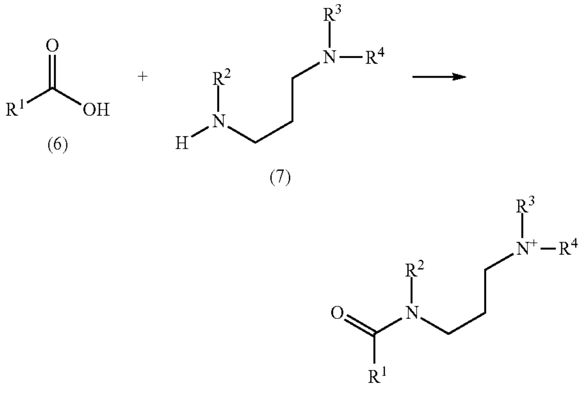

(6) (7) (5)

In Scheme 2, $R^1$, $R^2$, $R^3$, and $R^4$ are each as defined above. In the preparation method according to Scheme 2, the diamine compound represented by Formula (7) is used at a molar ratio of 1:0.5-1.5, preferably 1:0.9-1.2, based on 1 mole of the fatty acid compound represented by Formula (6). Outside of the above range, unreacted materials not used in the reaction may be present in excess, which may result in economic loss. Also, in the preparation method according to Scheme 2, a reaction catalyst may be additionally used. The catalyst is not particularly limited, but at least one selected from among para-toluenesulfonic acid, phosphoric acid, hypophosphorous acid, sodium hypophosphite, and sulfuric acid may be used as the acid catalyst, and an alkali metal hydroxide such as sodium hydroxide, potassium hydroxide, etc. may be used as the base catalyst. As the metal catalyst, at least one selected from among Fe, Cu, Co, Ti, Sn, and Mn may be used. As for the amount of the catalyst, the acid catalyst may be used in an amount of 0.1 to 1.0 wt %, the basic catalyst may be used in an amount of 0.1 to 1.5 wt %, and the metal catalyst may be used in an amount of 0.1 to 1.0 wt %, based on the mass of the fatty acid compound represented by Formula (6). If the amount of the catalyst falls outside of the above range, there is a problem in that unreacted fatty acid and unreacted amine are present in large amounts. The reaction temperature is maintained at a temperature of 150° C. to 250° C. If the reaction temperature is too low, the reaction does not proceed efficiently, so a large amount of unreacted material may be present, whereas if the reaction temperature is too high, odors may occur due to the fatty acid. The phospholipid-based surfactant represented by Chemical Formula 2 prepared through the above preparation method may be used after being concentrated such that the solid content is 20 to 90 wt %.

With regard to this aspect of the present invention, the sulfosuccinate-based surfactant may be represented by Chemical Formula 3 below.

[Chemical Formula 3]

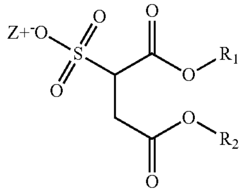

In Chemical Formula 3, $R_1$ and $R_2$ are the same as or different from each other, and are a C1-C22 linear or branched saturated alkyl group, and $Z^+$ is an alkali metal cation.

In one embodiment, in the surfactant represented by Chemical Formula 3, $Z^+$ is $Na^+$, $R_1$ is an octyl group having 8 carbon atoms, and $R_2$ is an octyl group having 8 carbon atoms.

In one embodiment, the surfactant represented by Chemical Formula 3 may be represented by Chemical Formula 4 below.

[Chemical Formula 4]

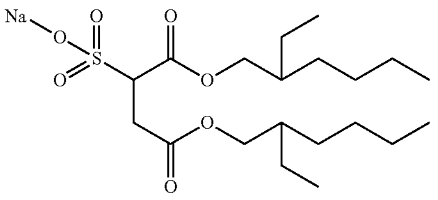

With regard to this aspect of the present invention, the composition satisfies at least one of the following characteristics:

(a) a surface tension of 27 or less; and (b) an interfacial tension of 3 or less.

With regard to this aspect of the present invention, the composition is used as a surfactant in semiconductor or display processing.

A better understanding of the present invention may be obtained through the following examples. These examples are merely set forth to illustrate the present invention, and are not to be construed as limiting the scope of the present invention.

Example 1

Preparation of Fluorinated Surfactant

Example 1-1. Preparation of Ethylene Oxide (8 Moles)-Added Fluorinated Surfactant 351 g (1 mole, molecular weight: 351, NIKKA, Japan) of a fluoroalcohol (perfluorohexylethyl alcohol) was placed in a closed reactor, and 0.7 g of a sodium hydroxide (NaOH, UNID, Korea) catalyst was also added thereto. Thereafter, the inside of the reactor was purged with nitrogen gas, the temperature was raised to 100° C., and dehydration was performed for 30 minutes under reduced pressure (1.33 kPa or less). Thereafter, when the temperature of the reactor reached 180° C., 352.4 g (8 moles, molecular weight: 44.05 g) of ethylene oxide was slowly introduced to start the reaction. After completion of introduction of the ethylene oxide gas, the resulting mixture was aged at the same temperature for 1 hour and then cooled to 60° C. to obtain a fluorinated ethylene oxide adduct (8).

The structural formula of the fluorinated ethylene oxide adduct thus obtained was as follows.

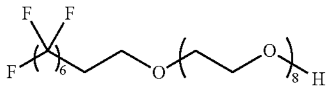

Example 1-2. Preparation of Ethylene Oxide (10 Moles)-Added Fluorinated Surfactant A fluorinated ethylene oxide adduct (10) was synthesized in the same manner as in Example 1-1, with the exception that ethylene oxide described in Example 1-1 was used in an amount of 440.5 g (10 moles, molecular weight: 44.05 g).

The structural formula of the fluorinated ethylene oxide adduct thus obtained was as follows.

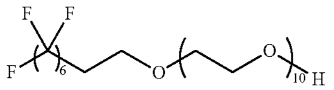

Examples 1-3. Preparation of Ethylene Oxide (30 Moles)-Added Fluorinated Surfactant A fluorinated ethylene oxide adduct (30) was synthesized in the same manner as in Example 1-1, with the exception that ethylene oxide described in Example 1-1 was used in an amount of 1321.5 g (30 moles, molecular weight: 44.05 g).

The structural formula of the fluorinated ethylene oxide adduct thus obtained was as follows.

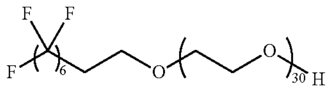

Example 2

Preparation of Phospholipid-Based Surfactant 305.03 g (1 mole, molecular weight: 305.03) of a bis(3-halo-2-hydroxypropyl)phosphate compound and 662.477 g of distilled water were placed in a reactor and stirred at 60° C. 284.48 g (1 mole, average molecular weight: 284.48) of an amidopropylamine compound was added thereto at 60° C. with gentle stirring. After completion of addition of the amide compound, the internal temperature of the reactor was raised from 60° C. to about 95° C., and the reaction was carried out for 6 hours.

The resulting product (solid content: 30%) was in a liquid state at room temperature. Production of the phospholipid-based surfactant compound was confirmed by peaks appearing at 2.6 ppm (—CHCH2N—) and 3.7 ppm (—CHOH) on the NMR spectrum (CDCl3).

Thereby, the chemical structural formula thereof was as follows.

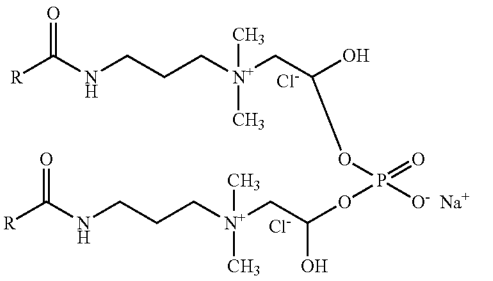

It was confirmed that the alkyl composition of R is a C8-18 mixture and also that lauryl (C12) is the main constituent thereof.

Example 3

Sulfosuccinate-Based Surfactant

The sulfosuccinate surfactant (hereinafter DOSS) used in Test Example 1 was KOREMUL K-290 (Hannong Chemicals, Korea) (solid content: 65%). The chemical structural formula thereof was as follows.

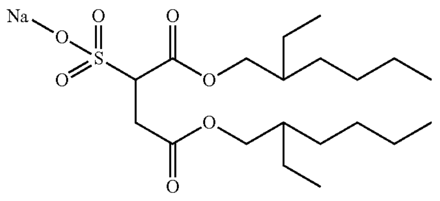

Example 4

Sodium Lauryl Sulfate-Based Surfactant

The sodium lauryl sulfate (hereinafter SLS) surfactant used in Test Example 1 was ASCO 30 (AK ChemTech, Korea) (solid content: 30%).

Example 5

Sodium Laureth Sulfate-Based Surfactant

The sodium laureth sulfate (hereinafter SLES) surfactant used in Test Example 1 was ASCO 24/4-26 (AK ChemTech, Korea) (solid content: 24%).

Example 6

Alpha-Olefin Sulfonate-Based Surfactant

The alpha-olefin sulfonate (hereinafter AOS) surfactant used in Test Example 1 was ASCO 1416 (AK ChemTech, Korea) (solid content: 96%).

Example 7

Polyoxyethylene (20) Sorbitan Monooleate-Based Surfactant

The polyoxyethylene (20) sorbitan monooleate surfactant used in Test Example 1 was TWEEN-80 (Samchun Chemicals, Korea) (solid content: 100%).

Example 8. Polyoxyethylene (20) Sorbitan Monolaurate-Based Surfactant

The polyoxyethylene (20) sorbitan monolaurate surfactant used in Test Example 1 was TWEEN-20 (Samchun Chemicals, Korea) (solid content: 100%).

Example 9

Polyoxyethylene (20) Sorbitan Trioleate-Based Surfactant

The polyoxyethylene (20) sorbitan trioleate surfactant used in Test Example 1 was TWEEN-85 (Samchun Chemicals, Korea) (solid content: 100%).

Example 10

Polyglycerin Fatty Acid Ester-Based Surfactant

The polyglycerin fatty acid ester surfactant used in Test Example 1 was ALMAX-9280 (Ilshin Wells, Korea) (solid content: 100%).

Example 11

Polyoxyethylene-Added Silicone-Based Surfactant

The polyoxyethylene-added silicone-based surfactant used in Test Example 1 was DC-193C Fluid (Dow Corning, USA) (solid content: 100%).

Test Example 1. Measurement of Surface Tension and Interfacial Tension (1) Measurement of Interfacial Tension of Single-Component Fluorinated Surfactant Among the compounds prepared or purchased above, the interfacial tension of the compounds of Examples 1-1 to 1-3 was measured through the following method, and the results thereof are shown in Table 1 below.

[Measurement Method]

Based on ASTM D971 using a K-100 interfacial tension meter available from KRUSS, interfacial tension in a 0.1% sample solution/cyclohexane solution was measured.

TABLE 1

| Example 1-1 | Example 1-2 | Example 1-3 | Interfacial tension (dyne/cm) |
|---|---|---|---|
| ○ | — | — | 6.8 |
| — | ○ | — | 7.6 |
| — | — | ○ | 9.1 |

As is apparent from the above results, interfacial tension was 6 or more when using only the surfactant of Example 1.

(2) Measurement of Interfacial Tension and Surface Tension of Mixed Composition

As is apparent from the above results, the interfacial tension of Mixing Example 1 in which Example 1-1 and the DOSS of Example 3 were mixed was significantly reduced.

Next, surfactant compositions were prepared by mixing the compounds prepared or purchased above at the ratios shown in Table 3 below.

The process shown in the following table was performed in order to select a suitable nonionic, amphoteric, or cationic surfactant, interfacial tension was measured in the same manner as above, and the results thereof are shown in Table 3 below.

TABLE 3

| | Example 1-1 | Example 3 (DOSS) | Example 7 (TWEEN80) | Example 9 (TWEEN85) | Example 8 (TWEEN20) | Example 10 (Almax9280) | Example 11 (DC-193C) | Example 2 | Interfacial tension (dyne/cm) |
|---|---|---|---|---|---|---|---|---|---|
| Mixing Example 5 | 75 | 15 | 10 | — | — | — | — | | 3.8 |
| Mixing Example 6 | 75 | 15 | — | 10 | — | — | — | — | 3.9 |
| Mixing Example 7 | 75 | 15 | — | — | 10 | — | — | — | 3.9 |
| Mixing Example 8 | 75 | 15 | — | — | — | 10 | | — | 4.6 |
| Mixing Example 9 | 75 | 15 | — | — | — | — | 10 | — | 6.2 |
| Mixing Example 10 | 75 | 15 | — | — | — | — | — | 10 | 2.1 |

(unit: gram)

Next, surfactant compositions were prepared by mixing the compounds prepared or purchased above at the ratios shown in Table 2 below.

The process shown in the following table was performed in order to select a suitable anionic surfactant, interfacial tension was measured in the same manner as above, and the results thereof are shown in Table 2 below.

TABLE 2

| | Example 1-1 | Example 3 (DOSS) | Example 4 (SLS) | Example 5 (SLES) | Example 6 (AOS) | Interfacial tension (dyne/cm) |
|---|---|---|---|---|---|---|
| Mixing Example 1 | 15 | 2 | — | — | — | 4.1 |
| Mixing Example 2 | 15 | — | 2 | — | — | 6.6 |
| Mixing Example 3 | 15 | — | — | 2 | — | 6.8 |
| Mixing Example 4 | 15 | — | — | — | 2 | 6.9 |

(unit: gram)

Next, based on the above results, surfactant compositions were prepared by mixing the compound of Example 1-1, the compound of Example 2, and the DOSS compound of Example 3 at the ratios shown in Table 4 below.

The process shown in the following table was performed in order to select a combination satisfying both surface tension and interfacial tension, interfacial tension was measured in the same manner as above, and surface tension was measured through the following method. The results thereof are shown in Table 4 below.

[Measurement Method]

Based on ASTM D1331 using a K-100 surface tension meter available from KRUSS, surface tension in a 0.1% sample/PGMEA (propyleneglycol methyl ether acetate) solution was measured.

TABLE 4

| | Example 1-1 | Example 2 | Example 3 (DOSS) | Surface tension (dyne/cm) | Interfacial tension (dyne/cm) |
|---|---|---|---|---|---|
| Mixing Example 11 | 60 | 40 | 0 | Not measured | 0.21 |
| Mixing Example 12 | 60 | 40 | 100 | 26.27 | 0.27 |

TABLE 4-continued

| | Example 1-1 | Example 2 | Example 3 (DOSS) | Surface tension (dyne/cm) | Interfacial tension (dyne/cm) |
|---|---|---|---|---|---|
| Mixing Example 13 | 60 | 0 | 40 | 21.24 | 4.43 |
| Mixing Example 14 | 80 | 20 | 20 | 26.5 | 0.78 |

(unit: gram)

As is apparent from the above description, the composition according to an aspect of the present invention can effectively exhibit an interfacial tension of 3 or less.

The composition according to an aspect of the present invention can effectively exhibit an interfacial tension of 2.5 or less.

The composition according to an aspect of the present invention can effectively exhibit an interfacial tension of 2.0 or less.

The composition according to an aspect of the present invention can effectively exhibit a surface tension of 27 or less.

The composition according to an aspect of the present invention can effectively exhibit both an interfacial tension of 3 or less and a surface tension of 27 or less.

The composition according to an aspect of the present invention can exhibit ease of application and dispersion and high permeability.

The composition according to an aspect of the present invention can exhibit the inherent surface properties of fluorine, such as low surface tension, water repellency, and oil repellency.

The composition according to an aspect of the present invention can be used as a surface modifier or a surfactant.

The composition according to an aspect of the present invention can be used as a stripper for use in semiconductor or display processing.

The composition according to an aspect of the present invention can be used as a cleaning solution for use in semiconductor or display processing.

The effects of the present invention are not limited to the above-mentioned effects. It should be understood that the effects of the present invention include all effects that can be inferred from the description of the present invention.

Although specific embodiments of the present disclosure have been described with reference to the accompanying drawings, those skilled in the art will appreciate that the present disclosure may be embodied in other specific forms without changing the technical spirit or essential features thereof. Thus, the embodiments described above should be understood to be non-limiting and illustrative in every way.

What is claimed is:

1. A composition comprising a fluorinated surfactant and a phospholipid-based surfactant, the composition being used as a surfactant, wherein the phospholipid-based surfactant is an amphiphilic gemini compound, wherein the phospholipid-based surfactant is represented by Chemical Formula 2 below:

[Chemical Formula 2]

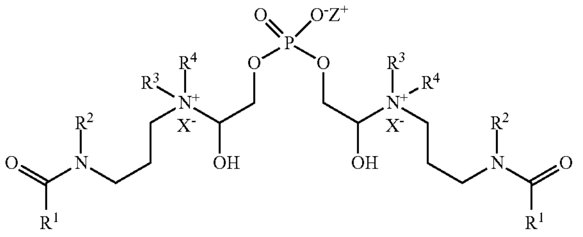

in Chemical Formula 2, $R^1$ is a C1-C22 linear or branched saturated alkyl group;

$R^2$, $R^3$, and $R^4$ are same as or different from each other, and are a hydrogen atom or a C1-C3 saturated alkyl group;

$X^-$ is a halogen anion; and $Z^+$ is an alkali metal cation.

2. The composition of claim 1, wherein the fluorinated surfactant is a nonionic surfactant.

3. The composition of claim 2, wherein the fluorinated surfactant is represented by Chemical Formula 1 below:

Rf—(CH2)y-(CH2CH2O)x-H [Chemical Formula 1]

wherein Rf is a linear or branched perfluorinated alkyl, a number of perfluorinated carbon atoms being 1 to 10, x is an integer of 1 to 50, and y is an integer of 1 to 10.

4. The composition of claim 1, wherein the phospholipid-based surfactant and the fluorinated surfactant are included at a weight ratio of 1:1-50.

5. The composition of claim 4, wherein the phospholipid-based surfactant and the fluorinated surfactant are included at a weight ratio of 1:2-15.

6. The composition of claim 1, further comprising a sulfosuccinate-based surfactant.

7. The composition of claim 6, wherein the composition comprises the fluorinated surfactant, the phospholipid-based surfactant, and the sulfosuccinate-based surfactant at a weight ratio of 1:0.1-3.0:0.1-3.0.

8. The composition of claim 7, wherein the composition comprises the fluorinated surfactant, the phospholipid-based surfactant, and the sulfosuccinate-based surfactant at a weight ratio of 1:0.1-1.0:0.1-2.0.

9. The composition of claim 6, wherein the sulfosuccinate-based surfactant is represented by Chemical Formula 3 below:

[Chemical Formula 3]

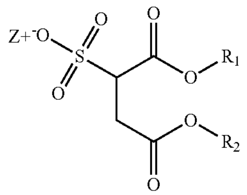

in Chemical Formula 3, $R^1$ and $R^2$ are same as or different from each other, and are a C1-C22 linear or branched saturated alkyl group; and $Z^+$ is an alkali metal cation.

10. The composition of claim 1, wherein the composition satisfies at least one of following characteristics:

(a) a surface tension of 27 or less; and (b) an interfacial tension of 3 or less.

11. The composition of claim 1, wherein the composition is used as a surfactant in semiconductor or display processing.

* * * * *